United States Patent [19]

Deri et al.

[11] Patent Number: 5,943,150
[45] Date of Patent: Aug. 24, 1999

[54] MASSIVELY PARALLEL PROCESSOR NETWORKS WITH OPTICAL EXPRESS CHANNELS

[75] Inventors: Robert J. Deri, Pleasanton; Eugene D. Brooks, III, Livermore; Ronald E. Haigh, Tracy; Anthony J. DeGroot, Castro Valley, all of Calif.

[73] Assignee: Regents of the University of California, Oakland, Calif.

[21] Appl. No.: 08/900,692

[22] Filed: Jul. 25, 1997

Related U.S. Application Data

[60] Provisional application No. 60/027,062, Sep. 30, 1996.

[51] Int. Cl.⁶ .................................................. H04B 10/20
[52] U.S. Cl. ............................ 359/133; 359/119; 359/127
[58] Field of Search .................................... 359/118, 119, 359/120, 121, 124, 125, 133

[56] References Cited

U.S. PATENT DOCUMENTS

| | | | |
|---|---|---|---|
| 4,914,648 | 4/1990 | Acampora et al. | 370/3 |
| 5,367,642 | 11/1994 | Dally | 395/325 |
| 5,446,572 | 8/1995 | Husbands et al. | 359/133 |
| 5,450,224 | 9/1995 | Johansson | 359/119 |
| 5,475,857 | 12/1995 | Dally | 395/800 |
| 5,483,369 | 1/1996 | Darcie et al. | 359/126 |
| 5,485,297 | 1/1996 | Sotom | 359/123 |
| 5,495,356 | 2/1996 | Sharony et al. | 359/128 |
| 5,504,608 | 4/1996 | Neeves et al. | 359/124 |
| 5,506,712 | 4/1996 | Sasayama et al. | 359/123 |
| 5,576,875 | 11/1996 | Chawki et al. | 359/125 |
| 5,625,478 | 4/1997 | Doerr et al. | 359/125 |
| 5,760,934 | 6/1998 | Sutter et al. | 359/119 |
| 5,764,821 | 6/1998 | Glance | 359/119 |

OTHER PUBLICATIONS

Journal of Lightwave Technology, vol. 14, No. 6, Jun. 1996, Scalable Multihop WDM Passive Ring with Optimal Wavelength Assignment and Adaptive Wavelength Routing, Duanyang Guo et al., pp. 1264–177.

Mohsen Kavehrad and Mahmoud Tabiani, "Selective–Broadcast Optical Passive Star Coupler Design for Dense WDM Networks," IEEE Photonics Technology Letters, vol. 3, No. 5, pp. 487–489, May 1991.

William J. Dally, "Express Cubes: Improving the Performance of k–ary n–cub Interconnection Networks," IEEE Transactions on Computers, vol. 40, No. 9, pp. 1016–1023, Sep. 1991.

H. Obara and Y. Hamazumi, "Star Coupler Based WDM Switch Employing Tunable Devices with Reduced Tunability Range," Electronics Letters, Vo. 28, No. 13, pp. 1268–1270, Jun. 18, 1992.

*Primary Examiner*—Rafael Bacares
*Attorney, Agent, or Firm*—Lloyd E. Dakin, Jr.; John P. Wooldridge

[57] ABSTRACT

An optical method for separating and routing local and express channel data comprises interconnecting the nodes in a network with fiber optic cables. A single fiber optic cable carries both express channel traffic and local channel traffic, e.g., in a massively parallel processor (MPP) network. Express channel traffic is placed on, or filtered from, the fiber optic cable at a light frequency or a color different from that of the local channel traffic. The express channel traffic is thus placed on a light carrier that skips over the local intermediate nodes one-by-one by reflecting off of selective mirrors placed at each local node. The local-channel-traffic light carriers pass through the selective mirrors and are not reflected. A single fiber optic cable can thus be threaded throughout a three-dimensional matrix of nodes with the x,y,z directions of propagation encoded by the color of the respective light carriers for both local and express channel traffic. Thus frequency division multiple access is used to hierarchically separate the local and express channels to eliminate the bucket brigade latencies that would otherwise result if the express traffic had to hop between every local node to reach its ultimate destination.

23 Claims, 3 Drawing Sheets

MASSIVELY PARALLEL PROCESSOR NETWORKS WITH OPTICAL EXPRESS CHANNELS

RELATED APPLICATIONS

This Application is a continuation-in-part of provisional U.S. patent application Ser. No. 60/027,062, filed Sep. 30, 1996 still pending.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to computer systems and fiber optics communication devices and more particularly to wavelength or frequency division multiple access of node interconnection in massively parallel processor networks according to local or express data traffic routing.

2. Description of Related Art

A key barrier to higher performance levels in massively parallel processors (MPPs) is the communication limits that exist amongst the individual processors and between the processors and main memory. Such communication limits include message latencies that could be reduced, e.g., by increasing bandwidth. The time delays between initial message transmission and reception stem from the use of information packets that are relayed many times, e.g., in a bucket-brigade fashion from node-to-node within a communication fabric. At each such node, the packet address header is read to route each message packet appropriately to its intended destination. If this occurs more than once, unnecessary latency in the delivery of the message packet is added and can stall processors waiting for the data. Performance suffers when the processors are starved of needed data. Too narrow a data bandwidth can also degrade performance by forcing the data needed by the processor to be broken into more than one packet. The processor cannot continue until all the required packets are received.

Multiprocessing is of great current interest for both general HPC applications, massively parallel processing, and integrated sensor/processor systems. Increases in system node count, computing power per node, and/or sensor-generated data rate increase the communication required to maintain a balanced system that fully utilizes available computing power and sensor data. Traditional electronic solutions are not keeping pace with advances in processor performance and sensor complexity and have increasing difficulty providing sufficient communication bandwidth. The trend towards shared memory (away from message passing) in multiprocessors places additional stress on inter-processor communications due to the short messages and rapid memory access associated with cache-to-cache coherence traffic.

Remote hyper-spectral sensing allows potential threats to be assessed with spectral information third axis imaging techniques. Three-dimensional data sets comprise layers of two-dimensional image pixels, with each layer representing a different spectral window. If each image layer contains $10^3 \times 10^3$ pixels each 12 bits deep and there are $10^3$ layers, one for each spectral bin, each cube would represent $1.2 \times 10^{10}$ bits of data. Thus, hyper-spectral sensing can generate one data cube per second, or a sensor data flow of $1.2 \times 10^{10}$ bits per second, enough to overwhelm communications, storage, and analysts' resources. The information flow can be reduced by down selecting data with artificial intelligence processors at each stage of a surveillance operation, e.g., using on-platform mathematical image transform filtering. However, such "smart" techniques require sophisticated data processing capabilities at the remote sensor platform.

Fourier transform techniques are conventionally used to "look" for high-spatial frequency, e.g., localized, events in each spectral bin. The number of floating-point operations required to perform a two-dimensional Fourier transform at every spectral slice of the data cube is $\sim 6N^3 \log_2 N$, where N is the number of elements along the edge of the data cube, e.g., $N^3$=the number of data elements in the cube. Since N=1000, about $\sim 6 \times 10^{10}$ floating point operations must done on each cube, e.g., $6 \times 10^{10}$ operations/cube times one data cubes/s=60 gigaflops, which indicates a multiprocessing approach in which many microprocessors are ganged together in parallel. However, the communication traffic generated, e.g., sensor/processor, processor/processor, and processor/memory, would be about 60 gigabytes/s in a balanced computing environment. This is far beyond the capabilities of prior art electronic busses.

Two basic approaches exist to increase a computer system's processing capability, e.g., run the clocks faster and/or do more in each clock period. The original Intel microprocessors had four-bit and eight-bit instruction words that were clocked at well under one megahertz. Today, individual Intel PENTIUM PRO microprocessors carry thirty-two and sixty-four bit instruction words that are clocked well over one hundred megahertz.

Parallel processing is an obvious way to increase the processing that occurs in each clock period. Super-micros, for example, have been connected by Intel and other prior art researchers into MPP networks for specialized applications. The processors communicate amongst themselves over network nodes that carry both local traffic and data earmarked for other regions of the network and input-output (I/O). But the performance improvement provided by putting more processors in parallel falls off as systems are scaled up beyond a hundred nodes by latency and bandwidth limitations. Each processor spends more time waiting for data the more the parallel system is scaled up. Such problems have been encountered by the Cray Research torus program with three-dimensional interwoven rings, the Intel paragon mesh program with two-dimensional rings without wraparound, and the Convex exemplar program where the symmetric multiprocessor (SMP) groups are on parallel rings.

William J. Dally describes the use of express channels in such systems in U.S. Pat. No. 5,367,642, issued Nov. 22, 1994, and U.S. Pat. No. 5,475,857, Dec. 12, 1995, and incorporated herein by reference. The express channels "serve as parallel alternative paths to local channels between non-local nodes of the network." See, Dally, William J. "Express Cubes: Improving the Performance of K-ary N-cube Interconnection Networks" VLSI Memorandum 89-564, Massachusetts Institute of Technology, Laboratory for Computer Science, October 1989. The object is to increase system throughput and reduce latency by eliminating some of the needless data congestion at the nodes. The method is analogous to the use of express trains and busses that carry commuters into the city core from the outlying regions. The separation of local commuters from distance commuters makes for a more efficient transportation system by reducing congestion.

Dally describes an interconnection network of an array of nodes, where each node in the array is capable of routing messages. Immediately adjacent nodes are connected to each other by local channels. Messages traveling from a source node to a destination node travel through local channels and through intermediate nodes interconnected by local channels between the nodes. The local channels may comprise duplex pairs of unidirectional channels with a separate unidirectional channel for carrying messages to a given node, as well as a separate unidirectional channel for carrying messages from the given node. "Express channels" are included that run in parallel with the local and intermediate channels. Such provide an alternative message path between the source nodes and the destination nodes.

Each express channel provides a path between pairs of more separated nodes that bypass the local traffic in the intermediate nodes. As such, messages traveling on the express channels are not incrementally delayed by each of the nodes between the source nodes and the destination nodes. The interconnection network further includes interchanges for interfacing the local channels with the express channels so that messages may travel over either the local channel or the express channel. Such an interconnection network is particularly well suited for a "k-ary, n-cube" topology.

In the simplest embodiment described, only a single express channel is used for any given row of an interconnection network. However, the use of additional express channels is generally preferred by Dally. The interconnection network nodes may comprise processors as well as memory, and the processors may include private memory. The interchange points are situated periodically throughout the interconnection network.

A hierarchical interchange organization is supposedly well suited for use with multiple express channels. In one hierarchical interchange organization, a first interchange interfaces a first of the express channels with the local channels, and a second interchange interfaces the second of the express channels with the local channels. Other hierarchical interchange configurations include more than two levels of express channels. Additional interchanges may be included to interface the multiple express channels with each other. Hierarchical interchanges may be positioned in a stepwise fashion so that messages can bubble up to a top level express channel and then descend back down to a bottom local channel level, e.g., to maximize efficiency. The benefit of such hierarchical organization is that the distance component of latency only increases logarithmically with increasing distance. Still further, the express channels may be provided in multiple dimensions. For instance, express channels may be provided for linear arrays of nodes oriented in each of the multiple dimensions.

Dally observes that low-dimensional k-ary n-cube interconnection networks have node delays that dominate their wire delays. For any message sent from a starting node to a destination node, the total delay the messages experience is primarily due to the delays incurred by traveling through intermediate nodes, compared to the delays incurred by traveling over wire channels. An ideal network could transfer messages at close to the speed of light. Unfortunately, low-dimensional, n=2 or n=3, k-ary n-cube interconnection networks in real systems have a distance-related component of latency that is more than an order of magnitude less than the speed of light. Low-dimensional k-ary n-cube interconnection networks also have channel widths that are limited by the node pin count, rather than being limited by wire density. The channel width of such networks can be limited by the wire density, but as a practical matter, the pin density and pin count primarily limit the channel width.

The ratio of node delay to wire delay and the ratio of pin density to wire density cannot generally be balanced in ordinary k-ary n-cube networks. By adding express channels, the wire length and wire density can be adjusted to be independent of the choice of radix (k), dimension (n) and channel width (w), e.g., a so-called "express cube". In general, the wire length of the express channels are increased to the point where the wire delays dominate the node delays and the latency approaches its optimal limit. The number of express channels is adjusted to increase throughput until the available wiring media is saturated.

The use of wavelength division multiplexing in communication networks is not new. Wavelength division multiplexing has conventionally been used to increase network capacity and bandwidth, to allocate bandwidth, and even to route information. Wavelength division multiplexing and free-space optics have been used to interconnect circuit boards within a computer. Some researchers have proposed a wavelength reuse scheme that enables larger asynchronous transfer mode (ATM) networks. None of such previous approaches has reduced the data latencies and increased message bandwidth.

The prior art has not suggested a very practical way to implement express channels and express cubes. The use of ordinary wire interconnects in the electronic embodiments of Dally's topologies prevents the use of long-distance express channels because high data rates cannot be supported. Every express channel link adds an additional electrical cable assembly to the system, and serious cost and mechanical design and layout difficulties are thereby encountered.

An information source must provide sufficient power to transmit to many destinations simultaneously because optical receivers will not produce error-free outputs unless they receive strong optical signals. When there are a lot of destinations, a large amount of power can be required. In response, systems designers can lower the power delivered to each destination, prune the number of destinations, or limit the transmitter power. None of such options are particularly desirable. Reducing the power received by each destination will reduce the data transmission rates that are possible, which slows down communication and the message throughput. Increasing the optical power is not always practical, because the devices used have maximum power limits or "eye-safe" laser powers that may be exceeded. Reducing the system size to have fewer nodes is incongruous when the object is to build large, parallel processing machines in which computational performance scales with number of nodes. Architectures that use n-to-n broadcast, n-to-n star couplers, or n-to-1 combining in the optical domain suffer from the power inefficiencies of 1/n.

The hardware design is complicated as more wavelengths are required to be emitted from each node in a system. Wavelength tunable lasers presently provide, at most, sixty-four different wavelengths. Multiple sources, each at a fixed wavelength, are needed to generate large numbers of wavelengths. But such multiplicity necessitates complex electronics and associated electronic packaging to build the transmitters involved.

A related issue is the number of wavelengths used in the system. Conventional telecom systems typically use only four wavelengths and are expected to grow to as many as thirty-two over time. If the system requires many wavelengths to support many nodes, it is unattractive because the system size, e.g., node count, will be limited by wavelength division multiplexing technology. If each node must receive all system wavelengths, and there are many system wavelengths, the cost and size of the opto-electronic receivers becomes a problem. In addition, interfacing the electronic output of all receivers to the node is a costly, complicated electronic problem for more than four receivers.

Where centralized controllers are needed to establish communication paths, e.g., to make sure two messages don't interfere with one another, the operation of the controller is unacceptably slow. Centralized controllers require information about transmissions occurring non-locally in the interconnect; it doesn't have to be a physically centralized device. Slow speed results from the need to gather information about transmission requests from all nodes, process this information, and then redistribute it to the nodes. Centralized control is slow because it takes time to set up the circuits. Such control is also complex and adds cost.

Architectures based on distributed, all-optical space switches or tunable wavelength switches require centralized control, because no logic or buffering is done within the switch fabric. The slow tuning of many wavelength switches can slow the system with delays that can exceed a microsecond.

Some schemes require that all messages be launched at the same time, to make sure that certain kinds of messages never coexist simultaneously on the same fiber and wavelength. Such prevents any two messages from interferring with one another. Global synchronization is difficult due to having to maintain accurate timing across a large system. Delays tend to vary, resulting in desynchronization.

Other schemes do not guarantee to prevent interference between messages. It is assumed that "collisions" that garble messages occurring on the same wavelength, spatial position, and time slot are detected, and that messages can be re-transmitted. This is undesirable because it complicates system management (collision detection hardware required), it increases communication delay when many messages exist (due to re-transmission after collisions), and it reduces the total throughput of information through the interconnect, typically by factors of 2 to 3. Such factors of 2-to-3 usually require global synchronization, or else even greater degradation occurs.

Architectures using optical broadcast require either central control bus arbitration or global synchronization pre-allocated transmission times, or else they cannot guarantee delivery.

Sasayama et al., describe in U.S. Pat. No. 5,506,712, a time-slotted, synchronized wavelength division multiplexing approach to connect each of m inputs to some number of outputs. It requires one system wavelength for every input port, e.g., each tunable frequency converter means on each input highway assigns mutually different frequency channels to the optical signals on each highway. This is undesirable, because the number of frequency channels is likely to be limited by practical constraints; for example, the stability of source and multiplexer components. Such, in turn, limit the number of inputs to the system. Sasayama, et al., requires an m-wavelength tunable source at each of the m switch inputs. Such components are currently research curiosities and are not commercially available. Inexpensive components of this type are unlikely to become available in the near future. Thus, the large number of difficult-to-obtain components in the system is undesirable because it adds significant cost. An additional disadvantage of this patent is the requirement for time-slotting. Each message on every input is transmitted in synchronization with all other messages, to ensure that no two messages are broadcast on the same wavelength in the same timeslot. This requires global synchronization because it adds complexity. Maintaining timing synchronization is difficult in a distributed system.

Charles Husbands describes in U.S. Pat. No. 5,446,572, a broadcast architecture in which the optical power is broadcast from each transmitter into a common channel connected to every receiver in the system. Such combining reduces the power available to each connection by 1/n, where n is the number of wavelength division multiplexers being combined. So a lot of optical power is required from each transmitter to begin with, and the transmitter power must be increased with each transmitter/receiver node added to a system. High levels of optical power reduce reliability, increase power consumption, and can prevent the system from being "eye safe" for maintenance personnel. But reducing the overall power even as the number of nodes increase forces lower bit rates, because the receiver sensitivity requirements for error-free operation at high bit rate will be exceeded.

For large numbers of nodes, it is difficult to build an n:1 combiner. It would be better to guide each optical output to a single destination to make the best use of the optical power, e.g., using simple 2:1 combining and dividing wavelength-selective elements. Requiring n wavelength sources at each of the n system transmitters means a very large number of sources (n×n) are needed in a system. This adds cost, reduces reliability, and requires substantial electronic circuitry to address each wavelength source independently.

Sotom describes in U.S. Pat. No. 5,485,297, an optical switch that uses tunable wavelength division multiplexing sources, and optical switch matrices plus star couplers to route wavelength division multiplexing transmissions to a particular destination. The purpose of the switches is to minimize the size of the star coupler to improve optical power utilization and minimize the number of system wavelengths required by routing messages on the same wavelength to different star couplers. The disadvantage of this approach is the need for a centralized control that analyzes the traffic pattern for the inputs and then sets all the switches to make sure two signals on the same wavelength never go to the same star. This kind of centralized control is slow, complex, and costly.

Sharony et al., describes in U.S. Pat. No. 5,495,356, a time-slotted approach that requires global synchronization. Optical space switches, e.g., photonic switches in FIG. 4, or wavelength switching is used for wavelength selective switching. Centralized control is needed to operate such switches. Sharony et al., also uses 1:n splitting which is power inefficient and has limited switch tuning times.

H. Obara and Y. Hamazumi, in "Star coupler based wavelength division multiplexer switch employing tunable devices with reduced tunability range", *Electronics Letters*, Jun. 18, 1992; Vol. 28, No. 13, pp. 1268–1270, describe a star coupler broadcast that is power inefficient. A set of tunable laser diodes are used, corresponding to one tunable laser per switch input. Fewer tunable components, about one per every four nodes, is preferred for improved cost and reliability. The architecture described requires centralized control and can be rather complex.

M. Kavehrad and M. Tabiani describe in "Selective broadcast optical passive star coupler design for dense wavelength division multiplexer networks", *IEEE Photonics Letters*, vol. 3, no. 5, May 1991, pp. 487–489, reducing the splitting loss power inefficiency by selective broadcast optical star coupler to limit broadcasts to only a few nodes. The proposed device appears complicated to build and attempts to tradeoff splitting losses against the number of system wavelengths used. In one implementation shown, the number of system wavelengths equals the number of nodes. This is unattractive, because the total number of system wavelengths is likely to be technologically limited and limits the size of the system by limiting the number of nodes.

Darcie et al., describes in U.S. Pat. No. 5,483,369, systems based on multiplexing of RF signals on carrier frequencies up to a few GHz, or $10^9$ Hz, and using surface-acoustic-wave devices. Such does not translate well to the multiplexing of optical signals on carrier frequencies on the order of $10^{15}$ Hz. The system Darcie proposes uses carrier frequencies that are so low that only a very few high speed (GHz) channels can be multiplexed, since the desired channel modulation/transmission rate must always be significantly less than the total spectral extent.

SUMMARY OF THE INVENTION

An object of the present invention is to provide a scalable parallel processor system.

A further object of the present invention is to provide an interconnect system for networks with large numbers of nodes using express channels to improve performance.

A still further object of the present invention is to provide an optical method for separating and routing local and express channel data.

Briefly, an optical method for separating and routing local and express channel data comprises interconnecting the nodes in a network with fiber optic cables. A single fiber optic cable carries both express channel traffic and local channel traffic. Express channel traffic is placed on, or filtered from, the fiber optic cable at a light frequency or a color different from that of the local channel traffic. The express channel traffic is thus placed on a light carrier that skips over the local intermediate nodes one-by-one by reflecting off of selective mirrors placed at each local node. The local-channel-traffic light carriers pass through the selective mirrors and are not reflected. A single fiber optic cable can thus be threaded throughout a three-dimensional matrix of nodes with the x,y,z directions of propagation encoded by the color of the respective light carriers for both local and express channel traffic. Thus frequency division multiple access is used to separate the local and express channels in a hierarchy.

An advantage of the present invention is a massively parallel processor system is provided that can exceed a thousand nodes without substantial performance degradation due to conventional latency and bandwidth limitations.

Another advantage of the present invention is that an interconnect system for networks with large numbers of nodes is provided that reduces the cost and bulk to effect the wiring between nodes.

A still further advantage of the present invention is an optical method for separating and routing local and express channel data is provided that is inherently free of significant latency and bandwidth problems.

Another advantage of the present invention is an optical method for separating and routing local and express channel data is provided in which each transmission on a particular wavelength is destined for only one destination, so maximally efficient use is made of optical power.

An advantage of the present invention is an optical method for separating and routing local and express channel data is provided that uses a single wavelength at most nodes. No wavelength tuning is required at such nodes. Multiple wavelength sources are thus needed at only a few nodes.

DETAILED DESCRIPTION OF THE INVENTION

Figure 1:
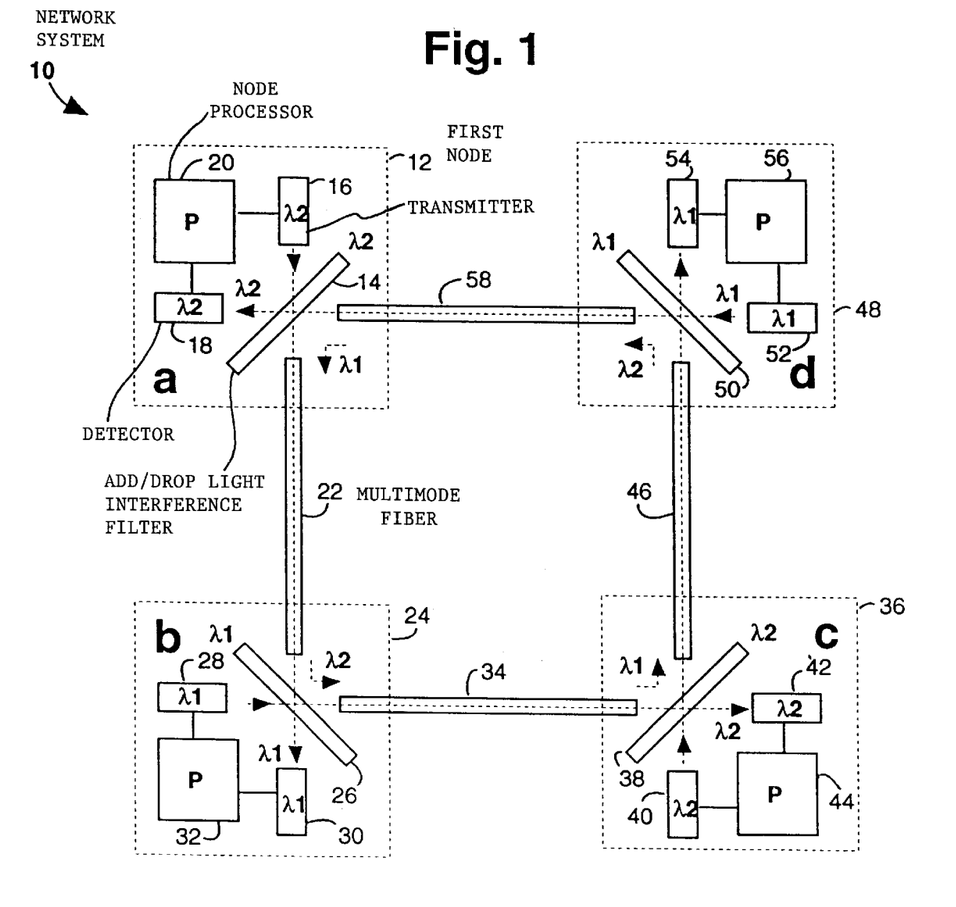
FIG. 1 is a diagram of a network computing system embodiment of the present invention showing the use of two wavelengths and a single fiber optic cable daisy chained to support overlapping express channels.

FIG. 1 illustrates a network computing system of the present invention for parallel processing, and referred to herein by the general reference numeral 10. While only four network nodes (a–d) are shown in a ring topology, such are intended to represent the case of a thousand or more nodes connected together and in other topologies including bus and star types.

The system 10 comprises a first node (a) 12 that includes an add/drop light interference filter 14 for a light wavelength $\lambda_2$, a laser diode transmitter 16 tuned to the light wavelength $\lambda_2$, a photo-detector 18 and a node processor (P) 20. A multi-mode fiber (MMF) 22 carries any light transmitted by the laser diode transmitter 16 that passed through the add/drop light interference filter 14 and any non-$\lambda_2$ that reflected.

A second node (b) 24 includes an add/drop light interference filter 26 for a light wavelength $\lambda_1$, a laser diode transmitter 28 tuned to the light wavelength $\lambda_1$, a photo-detector 30 and a node processor (P) 32. Another multi-mode fiber (MMF) 34 carries any light transmitted by the laser diode transmitter 28 that passed through the add/drop light interference filter 26 and any non-$\lambda_1$ that was reflected from MMF 22. Such non-$\lambda_1$ light includes the $\lambda_2$ light emitted by laser diode transmitter 16.

The system 10 further comprises a third node (c) 36 that includes an add/drop light interference filter 38 for the light wavelength $\lambda_2$, a laser diode transmitter 40 tuned to the light wavelength $\lambda_2$, a photo-detector 42 and a node processor (P) 44. A multi-mode fiber (MMF) 46 carries any light transmitted by the laser diode transmitter 40 that passed through the add/drop light interference filter 38 and any non-$\lambda_2$ that reflected. Such non-$\lambda_2$ light includes the $\lambda_1$ light emitted by laser diode transmitter 28 and is ultimately received by the photo-detector 54.

A fourth node (d) 48 includes an add/drop light interference filter 50 for the light wavelength $\lambda_1$, a laser diode transmitter 52 tuned to the light wavelength $\lambda_1$, a photo-detector 54 and a node processor (P) 56. Another multi-mode fiber (MMF) 58 carries any light transmitted by the laser diode transmitter 52 that passed through the add/drop light interference filter 50 and any non-$\lambda_1$ that was reflected from MMF 46. Such non-$\lambda_1$ light includes the $\lambda_2$ light emitted by laser diode transmitter 40 and is ultimately received by the photo-detector 18.

The forwarding of the $\lambda_1$ light from the laser diode transmitter 28 at node (b) 24 by node (c) 36 to node (d) 48 incurs none of the usual latency caused by conventional systems. The discrimination of whether the $\lambda_1$ light from the laser diode transmitter 28 was for local consumption by the node (c) 36 or should be forwarded to the next node required no processing time. Similarly, the forwarding of the $\lambda_2$ light from the laser diode transmitter 40 at node (c) 36 by node (d) 48 to node (a) 12 also did not incur any of the usual latency common to conventional systems. The discrimination of whether the $\lambda_2$ light from the laser diode transmitter 40 was for local consumption by the node (d) 48 or should be forwarded to the next node also required no processing time. This, in spite of the fact that both the $\lambda_1$ and the $\lambda_2$ light shared the same single MMF 46, and did so without interference. It is estimated that practical embodiments of the present invention can use as many as sixteen different wavelengths of light separated by as little as five nanometers in wavelength.

Figure 2:
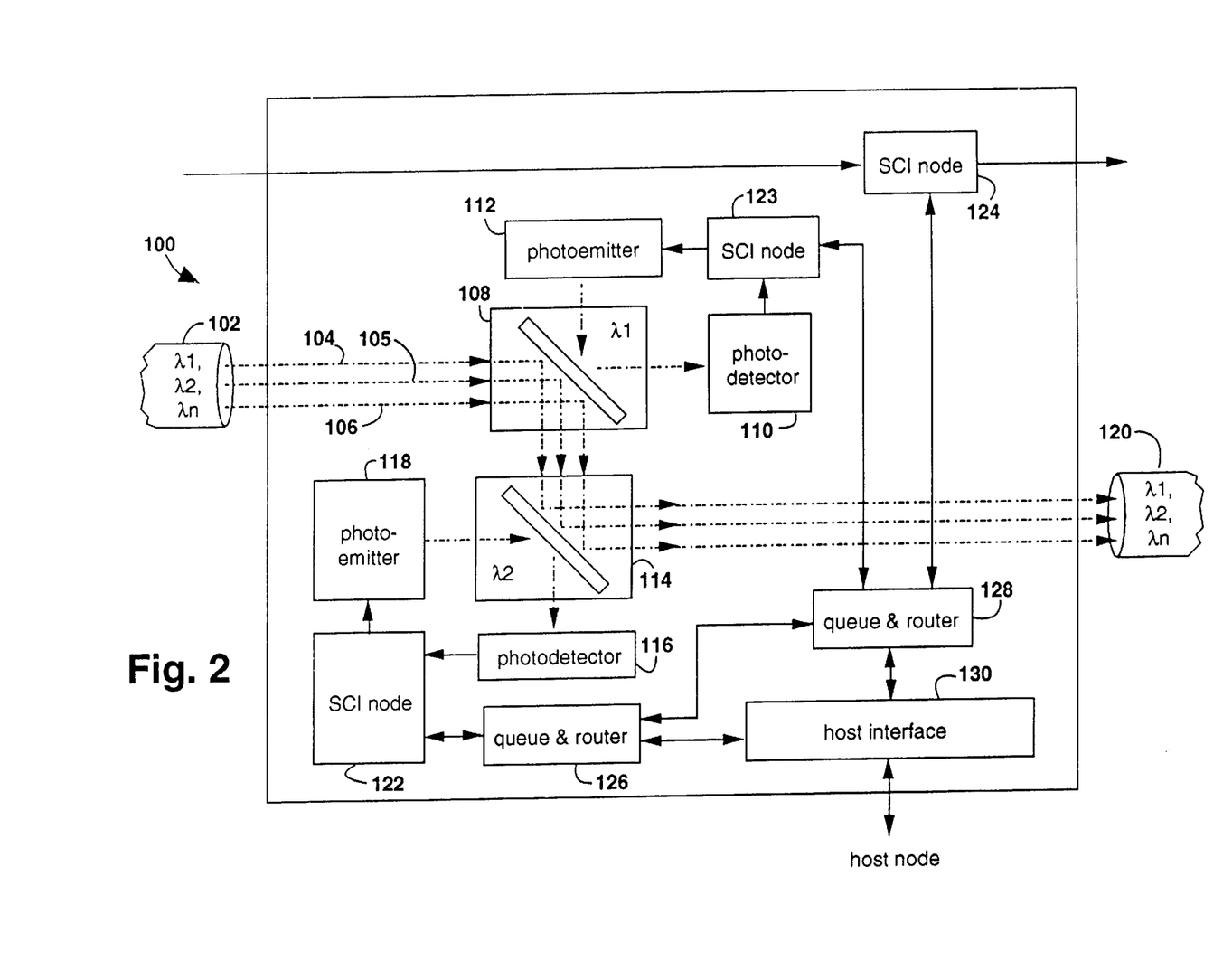
FIG. 2 is a block diagram of a printed circuit board embodiment of the present invention showing the optical tap of a node for two wavelengths.

FIG. 2 illustrates a printed circuit (PC) board embodiment of the present invention, referred to herein by the general reference numeral 100. A fiber optic cable 102 introduces several discrete beams of light represented by beams 104–106 from another node in a network that include wavelengths $\lambda_1$, $\lambda_2$ and $\lambda_n$. An add/drop mirror 108 tuned to wavelength $\lambda_1$ removes signals having wavelength $\lambda_1$ in the beams 104–106 by passing them straight through to a photo-detector 110. A photo-emitter 112 adds new signals having wavelength $\lambda_1$ into the beams 104–106 before passing them on to a add/drop mirror 114 tuned to wavelength $\lambda_2$. Incoming signals from the fiber optic cable 102 having the wavelength $\lambda_2$ and $\lambda_n$ reflect from the add/drop mirror 108. Signals with wavelengths $\lambda_2$ pass straight through the add/drop mirror 114 to a photo-detector 116. Signals with wavelengths $\lambda_1$ and $\lambda_n$ from the add/drop mirror 108 are reflected by the add/drop mirror 114. A photo-emitter 118 adds new signals having wavelength $\lambda_2$ into the beams 104–106 before passing them on to a fiber optic cable 120 which connects to a next node in the network. (In FIG. 2, light signals are represented by dashed lines and electrical signals are represented by solid lines.) Light signals having wavelengths other than $\lambda_1$ or $\lambda_2$ are passed through the PC board 100 without incurring a processing overhead. Therefore, signals not intended for delivery to the PC board 100 would preferably not use wavelengths $\lambda_1$ or $\lambda_2$. The PC board 100 would also be incapable of interfering with light signals other than those with wavelengths $\lambda_1$ or $\lambda_2$.

Alternatively, the fiber optic cables 102 and 120 comprise a parallel optical interconnect (POI) ribbon fiber cable of n-number of constituent fiber optic cables that each carry a bit of information. The POI ribbon thus provides for word-wide communication n-bits in width. Planar microlens arrays are used to focus each constituent fiber optic cable to its corresponding element in a photo-emitter and photo-detector array.

A set of three scalable coherent interface (SCI) interfaces are provided by SCI node chips 122–124. The SCI is defined by IEEE/ANSI standard number 1596, and is implemented in commercially available integrated circuits such as sold by LSI Logic (Milpitas, Calif.) as type L64601. The SCI uses a collection of fast point-to-point unidirectional links to provide data throughput that exceeds traditional computer-bus services for high-performance multiprocessor systems. The SCI supports distributed, shared memory with optional cache coherence for tightly coupled systems, and message-passing for loosely coupled systems. Initial SCI links are defined at one gigabyte/s (16-bit parallel) and one gigabits/s (serial). The internal transactions are implemented by packets and protocols defined by computer programs. SCI supports efficient multiprocessor lock and the usual read-and-write transactions. Distributed cache-coherence protocols are included in the commercially marketed devices and can recover from an arbitrary number of transmission failures. Multiprocessor conflicts cannot cause deadlocks or starvation because the SCI protocols will ensure forward progress. The transceivers, protocol logic and FIFO-registers all fit into a single chip and package. IBM reported at the International Solid State Circuits Conference (ISSCC) '95 that their BiCMOS SCI-link chip receiver and transmitter could operate at 1000 megabytes per second while communicating with user application logic at the same time. The IBM SCI-link chip uses thirty-six signal pins for each of the two high speed SCI links. No analog phase-locked-loop technology is used, which makes such parts easy to manufacture in quantity. The standard deskewing protocol in the SCI standard allowed IBM to implement dynamic compensation for cable skew. Thus, inexpensive cables can be used. Advanced CMOS processes were expected to be fast enough in 1995 that the BiCMOS process could be replaced.

The Dolphin 1.6 gigabit/sec SCI LINKCONTROLLER™, device type LC1600, is a CMOS implementation of the SCI link interface standard used for high throughput, low latency interconnection. It has two 1.6 Gigabit/sec SCI links, a 400 megabytes/sec local bus TTL interface, a 208-pin metal quad flat pack, and operates with twisted pair or fiber optic cables. The LINKCONTROLLER interface chip implements the transport layer protocols of the SCI standard. SCI protocols are pseudo bus protocols that allow distributed systems to be interconnected and operated at backplane speeds. The link chip connects to other node-local components through a unique local bus. The B-Link local bus is implemented as a low-cost multimaster bus connection. A high throughput built-in buffer management system supports SCI transactions and coherent cache line operations. The chip operates with 18-bit parallel twisted pair cables or with serial/parallel fiber optic links. The LinkController™ chip is a general purpose SCI interface chip and is part of Dolphin's architecture implementation of multiprocessor SCI interfaces. The LINKCONTROLLER chip can connect to an external CACHE DIRECTORY CONTROLLER (CDC) or a CACHE MEMORY CONTROLLER (CMC) through the B-Link local bus. The CDC/CMC chip implements the SCI protocols and send packets to the LINKCONTROLLER for transmission. Multiple LINKCONTROLLER chips can be connected to a node, thus accesses can be interleaved or duplicate links can be used in fault tolerant systems. The high throughput operation is suited for high performance bus bridge applications. The LINKCONTROLLER chip has built-in routing support so it can be used to design high throughput, low latency SCI switches.

Queue and routing functions are implemented with a pair of interconnected devices 126 and 128. These provide two-way data communication to a host node via a host interface 130.

Figure 3:
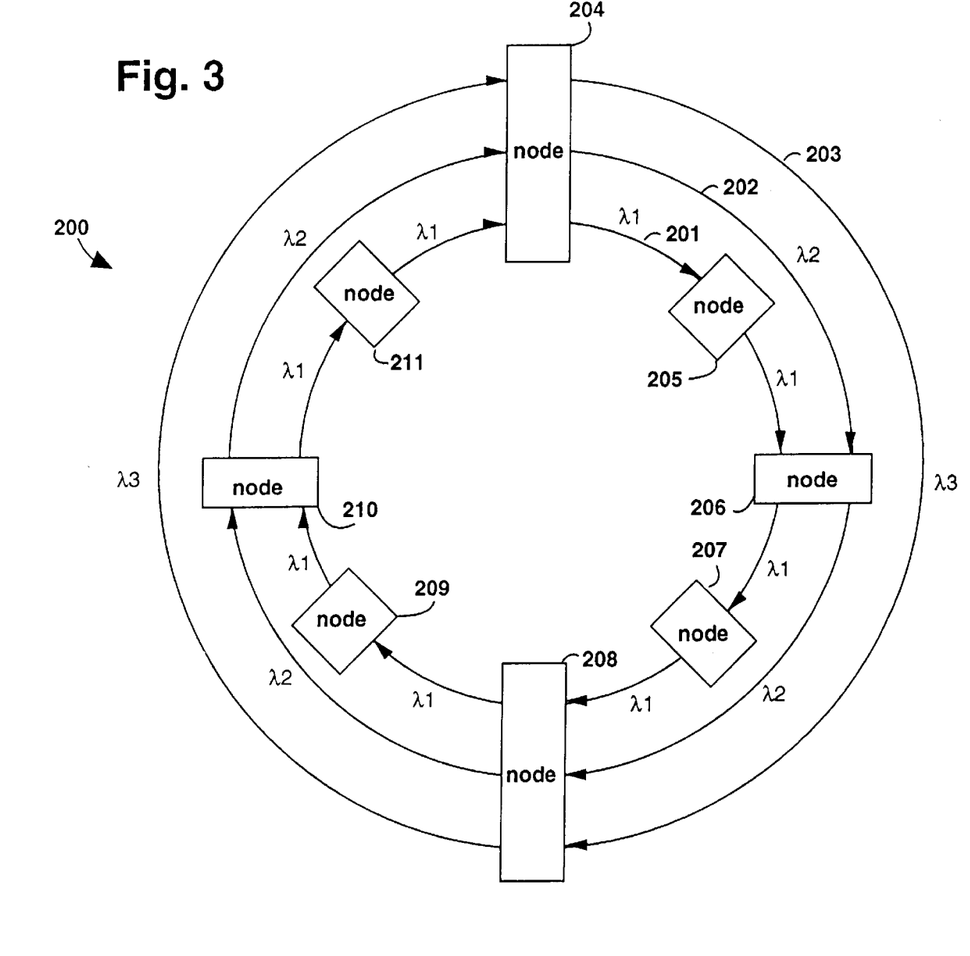
FIG. 3 is a block diagram of a network of the present invention showing a hierarchical ring topology and express channels realizable with the PC board of FIG. 2.

FIG. 3 represents a massively parallel processing (MPP) network embodiment of the present invention, referred to herein by the general reference numeral 200. A hierarchical set of ring communication networks, represented by rings 201–203 are provided. A plurality of network nodes, represented by nodes 204–211 are each connected to the ring 201 and communicate round robin on light carrier wavelength $\lambda_1$. The rings 202 and 203 provide first and second express channels. The ring 202 "stops" at the nodes 204, 206, 208, and 210. The nodes 205, 207, 209, and 211 are not participants in the network supported by the ring 202. The ring 203 is even more express than the ring 202, and stops only at nodes 204 and 208. The nodes 205–207, and 209–211 are not participants in the network supported by the ring 203. In one sense, the ring 201 could be thought of as a local area network (LAN) with clients at nodes 205, 207, 209, and 211 that are connected by a bridge located at any of nodes 204, 206, 208, and 210 to wider area networks on the rings 202 and 203.

The network 200 may be implemented at each node with the PC board 100 or similar embodiments. The three rings 201–203 illustrated in FIG. 3 are, in actual practice, carried in and out of every PC board 100 by fiber optic cables 102 and 120. The wavelengths that simply reflect through from fiber optic cable 102 to fiber optic cable 120, without being trapped by falling through the add/drop mirrors 108 or 114, are represented in FIG. 3 as not passing through particular nodes 205–207 and 209–211. For example, the wavelength $\lambda 3$ on the ring 203 skips past every one of nodes 205–207 and 209–211. The wavelengths represented by wavelengths $\lambda_1, \lambda_2, \lambda_n$ in FIG. 2 for PC board 100 may not be the same wavelengths from one PC board 100 to the next, in order to suit the topology and hierarchy illustrated in FIG. 3 and other topologies and hierarchies.

Embodiments of the present invention include rapidly reconfigurable, high-bandwidth crossbar switches. Higher complexity communication networks of arbitrary topology can be constructed from multiple units, to interconnect many nodes with exceptionally low latency and congestion. Hierarchical express channels suitable for both massively parallel processing and cluster computing are also made possible.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A hierarchical network topology, comprising:
    a fiber optic cable including,
        a local data channel on a first wavelength; and
        an express data channel on a second wavelength;
    a local node coupled to the fiber optic cable and including optical means to add/drop said first wavelength received from the fiber optic cable and to pass through said second wavelength; and
    a regional node coupled to the fiber optic cable and including optical means to add/drop said first wavelength and said second wavelength received from the fiber optic cable;
    whereby the first wavelength acts as a local traffic channel through the local and regional nodes; and
    whereby the second wavelength acts as an express traffic channel which by-passes the local node.

2. The topology of claim 1, wherein:
    the fiber optic cable is a parallel optical interconnect (POI) ribbon fiber cable of n-number of constituent fiber optic cables.

3. The network topology of claim 1, wherein:
    the local node and said optical means to add/drop said first wavelength includes,
        a selective wavelength filter, coupled to the fiber optic cable;
        a photo-emitter, coupled to transmit the first wavelength to the filter; and
        a photo-detector, coupled to receive the first wavelength from the filter.

4. The network topology of claim 1, wherein:
    the regional node and said optical means to add/drop said first and second wavelength light carriers include,
        a selective wavelength filter, coupled to the fiber optic cable;
        a pair of photo-emitters, coupled to respectively transmit the first and second wavelengths to the filter; and
        a pair of photo-detectors, coupled to respectively receive the first and second wavelengths from the filter.

5. A hierarchical network topology, comprising:
    an optical pathway, having first and second wavelengths;
    a first node, having,
        a first transceiver;
        a second transceiver; and
        a first optical filter, coupled to the optical pathway and the first and second transceivers, for passing the first and second wavelengths to and from the first and second transceivers respectively; and a second node, having,
        a third transceiver; and
        a second optical filter, coupled to the optical pathway and the third transceiver, for passing the first wavelength to and from the third transceiver, and directing the second wavelength away from the second node;
    whereby the first wavelength acts as a local traffic channel through the first and second nodes; and
    whereby the second wavelength acts as an express traffic channel which by-passes the second node.

6. The network of claim 5:
    wherein the optical pathway has a third wavelength;
    wherein the first node further comprises,
        a fourth transceiver;
    wherein the first optical filter is coupled to the fourth transceiver and passes the third wavelength to and from the fourth transceiver; and
    further comprising, a third node, having,
        a fifth transceiver;
        a sixth transceiver; and
        a third optical filter, coupled to the optical pathway and the fifth and sixth transceivers, for passing the first and second wavelengths to and from the fifth and sixth transceivers respectively, and directing the third wavelength away from the third node;
    whereby the third wavelength acts as a second express traffic channel which by-passes the second and third nodes.

7. The network of claim 5 further comprising:
    additional nodes, coupled to the optical path in a two dimensional matrix pattern and hierarchically addressed by the wavelengths.

8. The network of claim 5 further comprising,
    additional nodes, coupled to the optical path in a multi-dimensional matrix pattern and hierarchically addressed by the wavelengths.

9. The network of claim 5:
    wherein the optical pathway is an optical fiber.

10. The network of claim 5:
    wherein the optical pathway is a ribbon fiber cable.

11. The network of claim 10:
    wherein the ribbon fiber cable includes a set of fiber optic cables transmitting bits in parallel.

12. The network of claim 5:
    wherein the optical filters are optical add/drop filters.

13. A method for creating a hierarchical network, comprising the steps of:

configuring a first optical filter to pass a first and second wavelength to and from transceivers within a first node;

configuring a second optical filter to pass the first wavelength to and from transceivers within a second node, and direct the second wavelength away from the second node;

transmitting signals on the first wavelength, whereby a local traffic channel is created which passes through the first and second nodes; and transmitting signals on the second wavelength, whereby an express traffic channel is created which by-passes the second node.

14. The method of claim 13:

wherein the step of configuring a first optical filter comprises the step of,
configuring the first optical filter to pass a third wavelength to and from transceivers within the first node; further comprising the step of,
configuring a third optical filter to pass the first and second wavelengths to and from transceivers within a third node, and direct the third wavelength away from the third node.

15. The method of claim 14, further comprising the step of:
transmitting signals on the third wavelength, whereby a second express traffic channel is created which by-passes the second and third nodes.

16. The method of claim 13, further comprising the steps of:
configuring the hierarchical network into a two dimensional topology; and
addressing the network hierarchically with the wavelengths.

17. The method of claim 13, further comprising the step of:
configuring the hierarchical network into a multi-dimensional topology; and
addressing the network hierarchically with the wavelengths.

18. A system for creating a hierarchical network, comprising:
means for configuring a first optical filter to pass a first and second wavelength to and from transceivers within a first node;
means for configuring a second optical filter to pass the first wavelength to and from transceivers within a second node, and direct the second wavelength away from the second node;
means for transmitting signals on the first wavelength, whereby a local traffic channel is created which passes through the first and second nodes; and
means for transmitting signals on the second wavelength, whereby an express traffic channel is created which by-passes the second node.

19. The system of claim 18:

wherein the means for configuring a first optical filter comprises,
means for configuring the first optical filter to pass a third wavelength to and from transceivers within the first node; further comprising,
means for configuring a third optical filter to pass the first and second wavelengths to and from transceivers within a third node, and direct the third wavelength away from the third node.

20. The system of claim 19, further comprising:
means for transmitting signals on the third wavelength, whereby a second express traffic channel is created which by-passes the second and third nodes.

21. A computer-usable medium embodying computer program code for causing a computer to create a hierarchical network, by performing the steps of:
configuring a first optical filter to pass a first and second wavelength to and from transceivers within a first node;
configuring a second optical filter to pass the first wavelength to and from transceivers within a second node, and direct the second wavelength away from the second node;
transmitting signals on the first wavelength, whereby a local traffic channel is created which passes through the first and second nodes; and
transmitting signals on the second wavelength, whereby an express traffic channel is created which by-passes the second node.

22. The computer-usable medium of claim 21:

wherein the step of configuring a first optical filter performs the step of,
configuring the first optical filter to pass a third wavelength to and from transceivers within the first node; further performing the step of,
configuring a third optical filter to pass the first and second wavelengths to and from transceivers within a third node, and direct the third wavelength away from the third node.

23. The computer-usable medium of claim 22, further performing the step of:
transmitting signals on the third wavelength, whereby a second express traffic channel is created which by-passes the second and third nodes.

* * * * *